United States Patent [19]

Cottrell

[11] Patent Number: 5,465,084

[45] Date of Patent: Nov. 7, 1995

[54] METHOD TO PROVIDE SECURITY FOR A COMPUTER AND A DEVICE THEREFOR

[76] Inventor: Stephen R. Cottrell, 3507 Ross Rd., Palo Alto, Calif. 94303

[21] Appl. No.: 310,092

[22] Filed: Sep. 22, 1994

Related U.S. Application Data

[63] Continuation of Ser. No. 675,697, Mar. 27, 1991, abandoned, which is a continuation-in-part of Ser. No. 499,713, Mar. 27, 1990, abandoned.

[51] Int. Cl.$^6$ ........................................................ G06F 3/02
[52] U.S. Cl. ............................ 340/825.310; 340/825.34; 382/181; 382/190
[58] Field of Search ........................ 340/825.31, 825.34, 340/825.3; 352/10, 11, 34, 40; 235/382, 382.5; 434/118, 155, 336

[56] References Cited

U.S. PATENT DOCUMENTS

| | | | |
|---|---|---|---|
| 4,288,780 | 9/1981 | Theodoru et al. | 382/10 |
| 4,621,334 | 11/1986 | Garcia | 340/825.3 |
| 4,695,828 | 9/1987 | Yamamoto | 382/10 X |

*Primary Examiner*—Michael Horabik
*Attorney, Agent, or Firm*—Burns, Doane, Swecker & Mathis

[57] ABSTRACT

A method for controlling access to an area or an object consisting of storing in a memory library one or more predefined patterns of computer generated elements consisting of alphanumeric characters, symbols, and/or colors which can authorize access whereby a person requesting access can submit a pattern so that a device can compare the requestor's pattern with the predefined patterns in the memory library. If a match is found, the requestor is granted access to the controlled area or object.

18 Claims, 2 Drawing Sheets

METHOD TO PROVIDE SECURITY FOR A COMPUTER AND A DEVICE THEREFOR

This application is a continuation of application Ser. No. 07/675,697, filed Mar. 27, 1991, now abandoned, which is a continuation-in-part of application Ser. No. 07/499,713, filed Mar. 27, 1990, now abandoned.

FIELD OF THE INVENTION

This invention relates to a method for controlling access to an area or object, such as a computer or computer network, and the apparatus for carrying out such method.

BACKGROUND OF THE INVENTION

Prior devices such as keyed or combination locks have been used satisfactorily for a long time to control access to an area or thing. Such devices, however, can be defeated by the use of brute force, for example, by using a hacksaw. A common method for providing more sophisticated access control consists of using an alpha and/or numeric password which is entered into the security device and compared to a pre-established code in the memory of the security device. In the case of a computer, the password is entered by the user, usually by a keyboard. The order in which the alphanumeric characters of the password are entered is part of the password. The password can be thought of as a one-dimensional matrix or a vector. In practice, because of the difficulty in remembering a random string of characters, users often use easily remembered strings, like their names or birthdays. This system can be attacked by people who can guess the password or who program another computer to try dictionary words and randomly generated passwords until a match is found. If the password consists of five characters, a randomly generated group of characters has one chance in about 45 million of matching the password. With a modern personal computer this can be accomplished in only a few minutes. If the password is made up of ten alphanumeric characters, the chance of a random match decreases to one in $1.8 \times 10^{12}$. This is also within the capabilities of an inexpensive computer. Of course the security can be further increased by using a greater number of characters, but at some point (usually about 7 characters), the ability of the user's mind to memorize and retain the password is reduced to the point where the person must write down the password, thus greatly increasing the likelihood of a compromise of the security. This is especially true if the password is changed often.

While it is well known that pattern comparison can be accomplished by devices such as optical character readers, such devices rely on "reading" a finite number of points on each character and comparing that "read" against a library of the same points which will identify a character. Only a part of the pattern is matched against the library. In most cases, such approximation is sufficiently accurate for the purposes desired.

Likewise, security devices which "read" fingerprints or other physical characteristics of an individual and compare the fingerprint or other characteristic against a stored library of such data compares only a few selected points of the pattern and does not match the entire pattern. In these systems a perfect match of the pattern is not required; some predetermined percentage of the points is all that is required for a match. These devices, therefore, do not uniquely identify an individual.

Devices such as punched cards with predetermined patterns accomplish much of the same end. In a punched card, however, each element of the pattern can be in only one of two states. In the present invention there is no limit to the number of states that each element can represent. Furthermore, a punched card must be in the possession of the user and may be lost, stolen, or damaged. Other devices such as calculator keyboards may also be employed to generate a password pattern but these devices are also limited by each element of the pattern being limited to one of two possible states.

SUMMARY OF THE INVENTION

The object of the present invention is to provide a method of control access to an object which decreases the probability of unauthorized access over methods currently used and which does not unduly tax the mental powers of authorized users and to provide an apparatus for carrying out such method.

In accordance with the present invention the access code is described by one or more patterns, the elements of which are alphanumeric or other symbols and/or colors in a two or three dimensional array. The password can be extended to be a string of such arrays but the security provided by a single password array is sufficient for most purposes. Thus the password can be an easily remembered pattern of symbols and/or colors.

Other features and advantages of the present invention will become more apparent upon a perusal of the following specification in conjunction with the accompanying drawings.

DESCRIPTION OF THE PREFERRED EMBODIMENTS

While the present invention is applicable to provide secured access to any area or object, it is especially applicable to providing secured access to all or a portion of a central computer or network from any one or more terminals.

In order to understand the concept, and not for the purpose of claiming the invention, the password is merely a preselected two or three dimensional pattern of elements represented by symbols and/or colors, each of which can be represented by a unique computer code. For instance, the standard ASCII code translates 256 European language alphanumerics and symbols into a one-byte computer code. Other languages, such as Chinese, because of the much larger number of characters, require more than one byte. Likewise when the elements of the pattern are colors, they may be generated by any of the commercially available computer color generators such as VGA (Video Graphics Array). The element may also consist of a combination of symbol and color such that the letter "a" in red is represented by a different binary code than the letter "a" rendered in green. The pattern may also consist of different colors without any symbols. A person wishing to obtain access to the protected device merely describes the pattern by some means available to that person and also recognizable by the security device so the security device can compare the pattern of symbols and/or colors (the "password") presented by the person seeking access and the permitted patterns on a position-and-symbol to position-and-symbol basis and without regard to the sequence in which the elements (e.g. symbols and/or colors) constituting the pattern are entered. The patterns are compared and if the pattern presented matches one of the authorized patterns, the device grants access to the requestor. A simple 10×10 grid in which a password pattern of any size is entered produces a device which has a chance of a random match of one in $6.6 \times 10^{240}$ if only the standard 256 ASCII characters are used. It is virtually impossible to obtain a match to the pattern through a random guess, even with the fastest supercomputer.

Figure 1:
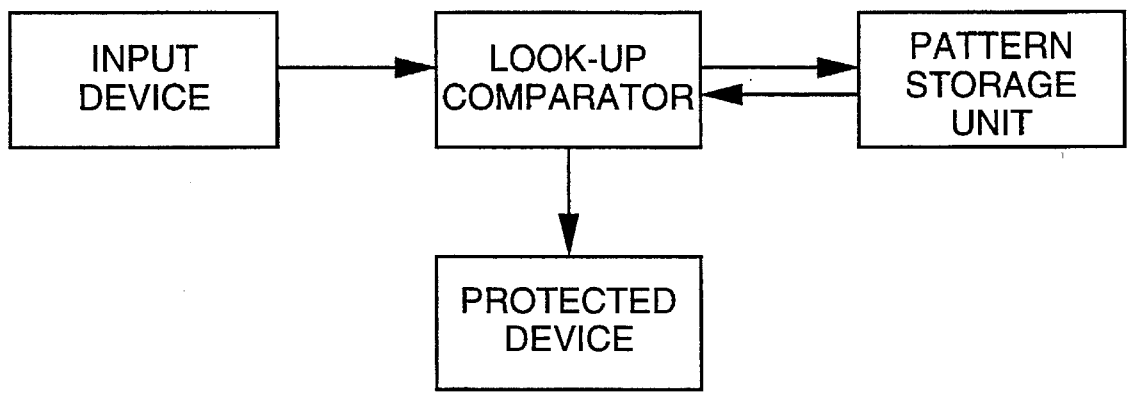
FIG. 1 is a block diagram illustrating the components of one apparatus capable of carrying out the method of the present invention.

FIG. 1 sets forth the elements of the present invention in relation to its use as a security device for a computer system. The user seeking access to the protected device enters the user's pre-assigned pattern in the input device. We refer to the arrangement of symbols and/or colors in a specific geometric configuration as the pattern. The pattern is transferred by any of a number of ways known to the art (e.g. by direct connection, through a modem over a telephone or other circuit, a local area network etc.) to the Look Up Comparator, which can be a separate device or incorporated as a subsystem of the protected device. Many Look Up Comparators are available which would be suitable for the purposes of the present invention. An example would be a spell-checker sub-routine used in many word processing programs. The Look Up Comparator then checks the pattern received from the requesting user with the authorized patterns which have been stored in the Pattern Storage Unit, which can also be a separate unit of a subsystem of the protected device. An example of a suitable Pattern Storage Unit is any commercially available magnetic hard or floppy disk storage unit, computer tape, random access memory, read only memory etc. Once the Look Up Comparator finds a match, the authorized user is granted access to the protected device or any preselected portions thereof.

Figure 2:
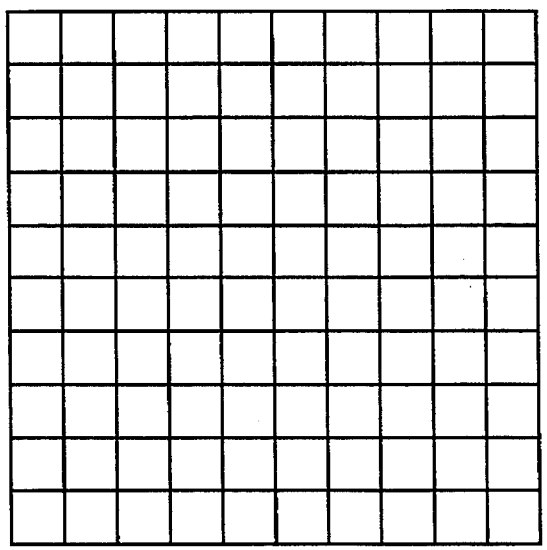
FIG. 2 is a diagram of a 10×10 matrix as it might appear on a computer display or on a computer terminal.

FIG. 2 shows how a computer display or terminal might display a 10×10 array. Such a matrix or other geometric configuration will be presented by the computer on the display used by someone attempting to gain access to the computer or associated network. Such a matrix or other geometric arrangement of elements will be presented on the display used by someone attempting to gain access to the computer or network. The password of the user is entered into the array by any of various methods; the usual method being to first select the location of the element by use of a pointer or other cursor and then entering the symbol and/or color via a computer keyboard. When the pattern is complete, the user sends a signal to the computer which then proceeds to search for a matching pattern in memory. Because the pattern is not read until all of the elements have been entered, the order of entry is immaterial.

Figure 3:
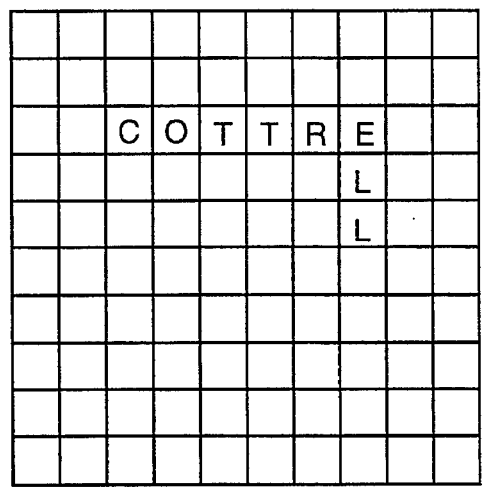
FIG. 3 shows a typical password as entered into a 10×10 array.

FIG. 3 shows one such pattern as it might appear on a computer display. The pattern elements in this example are letters.

Figure 4:
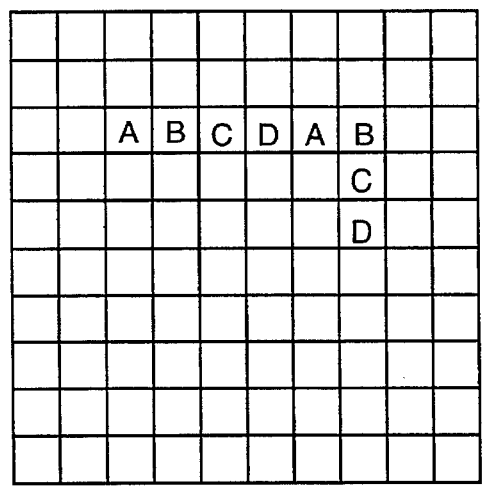
FIG. 4 shows another password using the same geometry as FIG. 3 but with different symbols.

FIG. 4 shows a pattern of the same geometry as FIG. 3 but with different letters in the elements. These two patterns do not constitute a match because there is not a one-to-one correspondence of both geometry and elements between the two patterns.

Figure 5:
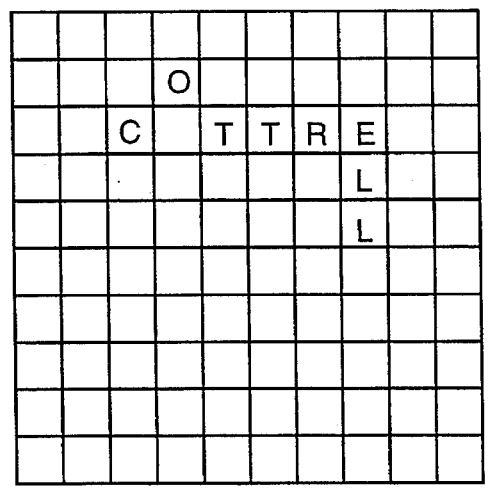
FIG. 5 is another password which uses the same symbols as FIG. 3 but a different geometry.

FIG. 5 shows another pattern. The symbols used in this pattern are the same as those used in FIG. 3 but the geometry is different, hence, these patterns also do not constitute a match.

The most common method for entering a pattern is by use of a computer keyboard, however, other means may be employed. Handwriting identification algorithms such as those developed by Go Inc. and Microsoft Inc. may be used to either select the location of the element or the symbol in the element, or both on a tablet or other compatible entry device. A light pen, mouse, track ball or joy stick could be used to move symbols from one area of the display to another in the same way that icons are moved in the Apple or Microsoft Windows 3 graphic interfaces.

Authorized users of the system will initially design a pattern which is unique to them. This pattern will be stored in computer memory, either in a specific desktop unit, a central storage unit, or in a network server. In this way a library of patterns of authorized users is compiled.

When a user wishes to use a computer or terminal, after being activated, the display will indicate that the user is to enter his or her pattern through whatever method is employed by that equipment (e.g. light pen, mouse, keyboard etc.). After the pattern is entered and transferred to the Look Up Comparator, the computer code of the pattern is compared by a computer program to the code of a pattern stored in the library. If any part of the computer code representing the pattern input by the requestor does not match the code of a pattern in the library, another library pattern is selected and a match is sought. This process is repeated until either a match is found or all library patterns have been compared with no match found. If a match is found the requestor is granted access. If no match is found the system will require the requestor to reenter his or her pattern. The number of allowed attempts to match the pattern, or the time allowed to enter the pattern, can be predetermined and the computer directed to take any of a series of actions, such as sounding an alarm, shutting down the terminal, or the like when the number of allowed tries or time is met.

The match between the pattern generated and by the would-be user of the computer and the patterns stored in the library depends on the location of the symbols and/or colors; it does not depend on the order in which the elements are entered into the pattern.

What I claim is:

1. A security system for limiting access to a device, comprising:

means for defining a master pattern, wherein said master pattern comprises a predetermined geometric arrangement of elements selected from at least one set of at least three elements each having respective information content that is different for each of said elements, such that each element in said master pattern has an associated position and information content;

a memory storing one or more master patterns defined by said master pattern defining means;

means for enabling a user to describe a pattern consisting of a geometric arrangement of elements;

a comparator for comparing a user-described pattern with the master patterns stored in said memory to determine whether the elements of a pattern described by a user have the same positions and information content as a master pattern stored in said memory; and means for granting access to said device if a user-described pattern is determined to match at least one of the stored master patterns.

2. The system of claim 1 wherein said set of elements comprises a set of alphanumeric characters.

3. The system of claim 2 wherein each of said master pattern defining means and said user enabling means includes a keyboard.

4. The system of claim 1 wherein said set of elements comprises a set of colors.

5. The system of claim 1 wherein said information content includes at least two attributes.

6. The system of claim 5 wherein one of said attributes is color.

7. The system of claim 6 wherein another one of said attributes is a designation of an alphanumeric character.

8. The system of claim 1, wherein said set of elements comprises at least three symbols which are different from one another.

9. A security system for limiting access to a device, comprising:

means for defining a master pattern, wherein said master pattern comprises a predetermined geometric arrangement of alphanumeric characters;

a memory storing one or more master patterns defined by said master pattern defining means;

means for enabling a user to describe a pattern consisting of a geometric arrangement of alphanumeric characters;

a comparator for comparing a user-described pattern with the master patterns stored in said memory to determine whether a pattern described by a user has the same alphanumeric characters in the same positions as a master pattern stored in said memory; and means for granting access to said device if a user-described pattern is determined to match at least one of the stored master patterns.

10. The system of claim 9 wherein each of the alphanumeric characters in a pattern also has an attribute associated with it, and said comparing means also determines whether the characters in a user-described pattern have the same respective attributes as the characters in a master pattern.

11. The system of claim 10 wherein said attribute is color.

12. A method for limiting access to a device comprising the steps of:

defining a master pattern wherein said master pattern comprises a predetermined geometric arrangement of elements selected from at least one set of at least three elements each having respective information content that is different for each of said elements, such that each element in said master pattern has an associated position and information content;

describing a second pattern consisting of a geometric arrangement of elements;

comparing the second pattern with the master pattern to determine whether the elements of the second pattern have the same positions and information content as the master pattern; and granting access to said device if the second pattern matches the master pattern.

13. The method of claim 12 wherein said set of elements comprises a set of alphanumeric characters.

14. The method of claim 12 wherein said set of elements comprises a set of colors.

15. The method of claim 12 wherein said information content includes at least two attributes.

16. The method of claim 15 wherein one of said attributes is color.

17. The method of claim 16 wherein another one of said attributes is a designation of an alphanumeric character.

18. The method of claim 12, wherein said set of elements comprises at least three symbols which are different from one another.

* * * * *